US000001141H

United States Statutory Invention Registration [19]

[11] Reg. Number: H1141

[43] Published: Feb. 2, 1993

Gelles et al.

[54] ASPHALT-BLOCK COPOLYMER ROOFING COMPOSITION

[75] Inventors: Richard Gelles; Mark A. Berggren, both of Houston, Tex.

[73] Assignee: Shell Oil Company, Houston, Tex.

[21] Appl. No.: 827,528

[22] Filed: Jan. 29, 1992

Related U.S. Application Data

[63] Continuation-in-part of Ser. No. 705,448, May 24, 1991, which is a continuation-in-part of Ser. No. 553,042, Jul. 16, 1990, Pat. No. 5,051,457.

[51] Int. Cl.[5] ..... C08L 95/00

[52] U.S. Cl. ..... 524/68

[58] Field of Search ..... 106/281.1; 524/68

[56] References Cited

U.S. PATENT DOCUMENTS

| | | | |
|---|---|---|---|
| Re. 27,145 | 6/1971 | Jones | 260/880 |
| 3,345,316 | 10/1967 | Nielsen | 260/28.5 |
| 3,611,888 | 10/1971 | Kavalir et al. | 94/18 |
| 3,856,732 | 12/1974 | Bresson et al. | 260/28.5 |
| 3,978,014 | 8/1976 | van Beem et al. | 260/28.5 |
| 4,172,061 | 10/1979 | Bresson | 260/28.5 |
| 4,250,067 | 2/1981 | Bresson | 260/28.5 |
| 4,282,127 | 8/1981 | Desgouilles | 260/28.5 |
| 4,332,703 | 6/1982 | Lijzenga et al. | 524/68 |
| 4,412,019 | 10/1983 | Kraus | 524/71 |
| 4,490,493 | 12/1984 | Mikols | 524/68 |
| 4,503,176 | 3/1985 | Barlow et al. | 524/62 |
| 4,530,625 | 7/1985 | Buck et al. | 524/68 |
| 4,738,996 | 4/1988 | Vonk et al. | 524/59 |
| 4,876,130 | 10/1989 | Vonk et al. | 524/68 |
| 4,904,713 | 2/1990 | Vonk et al. | 524/68 |

FOREIGN PATENT DOCUMENTS

| | | | |
|---|---|---|---|
| 740027 | 8/1966 | Australia . | |
| 0740027 | 8/1966 | Canada | 524/68 |
| 859226 | 12/1970 | Canada . | |
| 0072042 | 2/1983 | European Pat. Off. | 524/68 |
| 0234615 | 9/1987 | European Pat. Off. . | |
| 0238149 | 9/1987 | European Pat. Off. . | |
| 0280357 | 8/1988 | European Pat. Off. . | |
| 0285865 | 10/1988 | European Pat. Off. . | |
| 1946147 | 9/1970 | Fed. Rep. of Germany | 524/68 |
| 1130140 | 10/1968 | United Kingdom . | |
| 1143895 | 2/1969 | United Kingdom . | |
| 1284726 | 8/1971 | United Kingdom . | |
| 1279644 | 6/1972 | United Kingdom . | |
| 1329298 | 9/1973 | United Kingdom . | |
| 1338477 | 11/1973 | United Kingdom . | |
| 1554739 | 10/1979 | United Kingdom . | |

OTHER PUBLICATIONS

Letter from Inventor to Grant Mitchell dated May 25, 1989.

*Primary Examiner*—Robert L. Stoll
*Assistant Examiner*—Joseph D. Anthony

[57] ABSTRACT

A composition for use in roll roofing membrane applications which comprise:

(a) from about 1 part to about 50 parts per hundred of filler, and (b) from about 50 parts to about 99 parts per hundred of a bituminous composition which is comprised of (1) from about 87 to about 93 parts per hundred of a bituminous component having a penetration of greater than about 125 dmm at 25° C., and (2) from about 7 to about 13 parts per hundred of a hydrogenated block copolymer of a monoalkenyl aromatic hydrocarbon and a conjugated diolefin having a contour arm molecular weight before hydrogenation of from about 80,000 to about 150,000 and a polystyrene content of from about 25% to about 37%.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ASPHALT-BLOCK COPOLYMER ROOFING COMPOSITION

This is a continuation-in-part of application Ser. No. 705,448, filed May 24, 1991, which itself is a continuation-in-part of Ser. No. 553,042, filed July 16, 1990, now U.S. Pat. No. 5,051,457.

BACKGROUND OF THE INVENTION

Asphalt is a common material utilized for the preparation of roofing members and coatings which may be applied as mopping grade asphalts, cutback in solvents, single ply membranes, shingles, roll roofing membranes, etc. While the material is suitable in many respects, it inherently is deficient in some physical properties which it would be highly desirable to improve. Efforts have been made in this direction by addition of certain conjugated diene rubbers, neoprene, resins, fillers and other materials for the modification of one or more of the physical properties of the asphalt binder. Each of these added materials modifies the asphalt in one respect or another but certain deficiencies can be noted in all compounds proposed. For example, some of them have excellent weather resistance, sealing and bonding properties but are often deficient with respect to warm tack, modulus, hardness and other physical properties.

Since the late 1960s, styrene-butadiene rubber and styrene-rubber block copolymers such as styrene-butadiene-styrene and styrene-isoprene-styrene block copolymers have been used to dramatically improve the thermal and mechanical properties of asphalts. Practical application of the rubber addition approach requires that the blended product retain improved properties and homogenity during transportation, storage and processing. Long term performance of elastomer-modified asphalts also depends on the ability of the blend to maintain thermal and chemical stability.

To be suitable for synthetic roofing materials, the asphalt-block copolymer mixtures should meet the following requirements:

(a) sufficient resistance to flow at high temperatures,
(b) sufficient flexibility at low temperatures,
(c) workability according to the conventional methods used in the roofing technique,
(d) adequate hot storage stability,
(e) adequate hardness to prevent deformation during walking on the roof, and
(f) if it is to be used as an adhesive, sufficient adhesion.

For roll roofing applications, it is preferred that the softening point (the temperature at which the material will tend to flow) be above about 250° F., the cold bend temperature which is not as critical a parameter as the others in this application, (the temperature at which the material will crack during application and service) should be below about −5° C. and that the asphalt and block copolymer components should be able to be mixed at a temperature no higher than about 200° C. to keep the asphalt heating costs down and to prevent softening of the polyester reinforcement commonly used in these membranes.

For roll roofing membranes, the bituminous composition is used to saturate and coat a reinforcing mat. The bitumen is there to make the membrane waterproof. The mat is used to aid in mechanical properties (gives the membrane strength etc.). Polymer is added to the asphalt to improve the weatherability and mechanical properties of the asphalt.

At the present time, unhydrogenated block copolymers are being used in roll roofing applications. For instance, a linear unhydrogenated styrene-butadiene-styrene block copolymer with a total molecular weight of 110,000 and a polystyrene content of 31% could be used for such applications. When 12% of this block copolymer is used with an AC-10 grade asphalt from the Shell Oil Company Wood River Refinery (this asphalt has a softening point of 135° F. and a pen of 120 dmm), the softening point is about 230° F., the cold bend temperature is about −25° C. and the components can be mixed at a temperature of approximately 160°-180° C. Another unhydrogenated block copolymer, a coupled radial styrene-butadiene block copolymer with a total molecular weight of 264,000 and a polystyrene content of 31%, could also be used in such applications. When blended with the same asphalt at the same concentration, the softening point is approximately 262° F., the cold bend temperature is approximately −25° C. and the components can be mixed at approximately 180°-200° C. Unhydrogenated block copolymers have certain disadvantages which can cause problems when used in applications such as these. Such disadvantages include poor stability of the block copolymer during blending and storage of the bituminous composition and poor long term stability when the bituminous composition is exposed to the elements (by stability I mean resistance to degradation).

There is a problem using soft asphalts without filler. Such asphalts can give compositions that are too tacky and thus are difficult to handle in some applications. Also, compositions utilizing soft asphalts might be too soft at elevated temperatures so that, for example, if someone walks on a roof wherein such a composition is used, the roof may be damaged.

SUMMARY OF THE INVENTION

This invention relates to a composition for use in roll roofing membrane applications. The composition comprises a) from about 1 part to about 50 parts per hundred of filler b) from about 50 parts to about 99 parts per hundred of a bituminous composition which is comprised of (1) from about 87 to about 93 parts per hundred of a bituminous component having a penetration of greater than about 125 (decimillimeters) at 25° C. and (2) from about 7 to about 13 parts per hundred of a hydrogenated block copolymer of a monoalkenyl aromatic hydrocarbon and a conjugated diolefin having a contour arm molecular weight before hydrogenation of from about 80,000 to about 150,000 and a polystyrene content of from about 25% to about 37%.

DETAILED DESCRIPTION OF THE INVENTION

The bituminous component in the bituminous-block copolymer compositions according to the present invention may be a naturally occurring bitumen or derived from a mineral oil. Also petroleum derivatives obtained by a cracking process and cold tar can be used as the bituminous component as well as blends of various bituminous materials.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues. Suitable bituminous components (either "straight-run bitumens" or "fluxed bitumens") are those having a penetration of greater than about 125 (decimillimeters) at 25° C. In general, bituminous components with penetrations greater than about 125 are very compatible with block copolymers. As a result, blends of these bituminous components with block copolymers exhibit good property retention during weathering and aging. The amount of bituminous component to be used in the compositions of the present invention range from about 87 to about 93 parts per hundred of the bituminous component including the block copolymer component.

The block copolymer component is a hydrogenated block copolymer of a monoalkenyl aromatic hydrocarbon such as styrene and a conjugated diolefin such as butadiene or isoprene. Such elastomeric block copolymers can have general formulas A-B-A or $(AB)_nX$ wherein each A block is a monoalkenyl aromatic hydrocarbon polymer block, each B block is a conjugated diolefin polymer block, X is a coupling agent, and n is an integer from 2–30. Such block copolymers may be linear or may have a radial or star configuration as well as being tapered. Block copolymers such as these are well known and are described in many patents including U.S. Pat. No. Re. 27,145 issued Jun. 22, 1971 which describes hydrogenated block copolymers containing butadiene. This patent is herein incorporated by reference. The description of the type of polymers, the method of manufacturing the polymers and the method of hydrogenation of the polymers is described therein and is applicable to the production of block copolymer containing other alkenyl aromatic hydrocarbons and other conjugated diolefins such as isoprene or mixtures of conjugated diolefins.

The hydrogenated block copolymers of the present invention are used in an amount from about 7 to about 13 parts per hundred of the bituminous component including the block copolymer component. If less than about 7 parts of the block copolymers are used, then the cold temperature properties are usually not good enough. More than about 13 parts is usually not necessary to obtain the desired properties so any more would only increase the cost with very little benefit. Negatives at higher loadings include difficulties blending and processing due to high viscosities.

The block copolymer should have a molecular weight before hydrogenation of from about 80,000 to about 150,000. The molecular weights referred to herein are peak molecular weights determined by gel permeation chromatography (GPC). A lower molecular weight polymer would not provide sufficient properties without adding more of the polymer and thus adding to the expense. Also, the lower molecular weight polymers usually have a softening point which is below the minimum required of 250° F. If the molecular weight is above about 150,000, then the blends with the bituminous component are difficult to process and prepare.

The molecular weight ranges referred to herein are the contour arm molecular weights. Radial and star polymers have much higher total molecular weight than linear polymers do but the mechanical properties considered herein are dependent not upon the total molecular weight in the case of radial and star polymers but rather on the molecular weight of the contour arms of those polymers. For a linear A—B—A polymer, the contour molecular weight is the same as the total molecular weight and the molecular weight range of the present invention is 80,000 to 150,000 for linear polymers. For three arm radial polymers, one must multiply the contour arm molecular weight by 1.5 to obtain the total molecular weight. Thus, the total molecular weight range for a three arm polymer of the present invention would be 120,000 to 315,000. For a four arm radial polymer, the range would be two times the contour molecular weight range or 160,000 to 300,000. In general, for a coupled radial or star polymer $(AB)_nX$, the contour molecular weight is the molecular weight along the contour of the molecule, which is $(AB)_2$. Thus, for a coupled radial or star polymer $(AB)_nX$, the total molecular weight range is (n/2 times the contour molecular weight range.

In order to be effective in the present application, the block polymer must have a polystyrene content ranging from about 25% to about 37%. If the polystyrene content is lower than about 25%, the physical properties are decreased and the molecular weight of the polymer would have to be much higher to get the proper physical properties and increasing the molecular weight causes mixing problems as stated above. It also, increases the cost of the polymer. If the polystyrene content is above about 37%, the bituminous component and the block polymer component are generally too hard to mix. The elastomeric properties tend to decrease because of the presence of a continuous styrene phase in the polymer.

The composition of the present invention contains fillers including calcium carbonate, limestone, chalk, ground rubber tires, etc. The fillers are present in an amount from about 1 to about 50 parts per hundred of filler and the bituminous composition. Other materials which may be incorporated in these composition include unsaturated block copolymers like SBS or SIS, etc. If other materials are added, the relative amounts of the bitumen and polymer and filler specified above remain the same. The filler level is chosen to give a final composition which is not too tacky or soft.

Mixtures of bitumens which include extenders like petroleum extracts etc. can be used in combination with bitumens which have penetrations of less than 125 dmm to make a final bitumen with a penetration of greater than 125 dmm. Also, polymers containing an extender oil in such an amount that when the oil extended polymer is added to the starting bitumen, the bitumen plus oil has a PEN of greater than 125 dmm even though the bitumen itself has a PEN of less than 125 dmm. It is understood that the mixtures referred to in the preceding two sentences are contemplated as being part of the present invention and are included within the scope of the claims.

The bituminous block copolymer compositions of the present invention may be prepared by various methods. A convenient method comprises blending of the two components at an elevated temperature, preferably not more than about 200° C. for the reasons discussed above. Other methods for preparing the composition of the present invention include precipitation or drying of the components from a common solvent and emulsifying the polymer with an asphalt emulsion.

EXAMPLES

Blends of asphalt and block copolymer were prepared using a laboratory Silverson high shear mixer. An appropriate amount of asphalt was heated in a quart can in an oven at 160° C. for 45 minutes. The quart can was then placed in a heating mantel and, with heat and stirring, its temperature was raised to the mixing temperature. The polymer was than added slowly. Mixing was completed after the homogenity of the mixture (judged visually) did not change for 15 minutes. To determine the mixing temperature used, an experiment was first performed in the following manner: the asphalt temperature was first set at 180° C. and the polymer was added. If it did not start to mix after 10 minutes, the temperature was raised 5° C. This was repeated until the initial temperature at which the polymer began to mix was determined.

The softening point measurements utilized herein were determined by ASTM D36. The penetration of the asphalts used herein was determined by ASTM D5. In order to determine the cold bend properties, samples 0.125 inches by 0.5 inches by 2.5 inches were prepared by pouring the molten blend into a mold and then pressing using shims. The next day the samples were placed in an environmental chamber and allowed to equilibrate at a starting temperature (e.g. −10° C.) for three hours. After equilibration, the samples were bent around a 1 inch cylindrical mandrel at a rate of 180° per 5 seconds. At this and subsequent temperatures, three samples were tested. The samples would either break or bend. Next, the chamber temperature was lowered 5° C. and allowed to equilibrate for one-half hour. The samples were then tested at that temperature. The process was continued until all three samples failed at a particular temperature. The lowest temperature at which all samples passed (bent without cracking) was reported as the cold bend temperature.

The asphalt used in the following examples was a flux which had a PEN so high it could not be measured. The molecular weights referred to in this example are peak molecular weights determined by gel permeation chromatography (GPC).

TABLE 1

| Polymer | Contour Arm Molecular Weight | PSC Concentration (%) | PSC Concentration (%) | Softening Point (°F.) | Penetration of Blend (dmm) | Brookfield Viscosity @ 180° C. (cps) |
|---|---|---|---|---|---|---|
| Polymer 1 | 61 | 29 | 12 | 223 | 48 | — |
| Polymer 2 | 91 | 31 | 12 | 252 | 49 | — |
| Polymer 3 | 120 | 31 | 12 | 276 | 49 | 3450 |
| Polymer 4 | 152 | 33 | 12 | 313 | 53 | reading unstable |
| Polymer 5 | 180 | 33 | 12 | >320 | 52 | no measurement |

Polymer 1 gives softening points which are too low at economic use levels. Polymers 4 and 5 give blends which are so elastic that their viscosities cannot be measured accurately. Polymer 5's blend was so elastic that in the Brookfield chamber, it acted like an elastic solid and revolved around rather than having the spindle spin through it. The blends with polymers 4 and 5 are difficult to process and prepare.

The following asphalts were used in the following experiment.

TABLE 2

| | Penetration |
|---|---|
| Asphalt 1 | 47 |
| Asphalt 2 | 183 |
| Asphalt 3 | 120 |

Blends of Polymer 1 at 12% were made with the three asphalts. Sheets of these blends were melt pressed and then adhered to stainless steel plates. These samples were weathered in QUV weathering device using QUV—B bulbs, a 60° C. temperature and a 20 hours light/4 hours condensation cycle. A simple fatigue test was run on non-weathered samples and samples that had been weathered 2,000 hours.

The samples were tested for fatigue life in the following way: sheets (100 mm ×50 mm) were adhered with a two part epoxy adhesive to two touching metal plates. The metal plates (each 152 mm tall by 406 mm wide) were then secured to an Instron Model 1350 fatigue tester maintained at 77° F. and then were slowly separated to an initial gap width of 1 mm. The dynamic fatigue mode is then engaged, and the gap width is cycled from 1 mm to 2 mm to 1 mm at a rate of 1 cycle/minute. Failure is noted at the first visible evidence of a crack or pinhole extending through the entire thickness of the test specimen. The results:

| 12% Polymer 1 Blends Fatigue (Number of Cycles to Failure) | Asphalt 1 | Asphalt 2 | Asphalt 3 |
|---|---|---|---|
| No weathering | >10,000 | >10,000 | >10,000 |
| Weathered | <10 | >10,000 | <10 |

Blends with asphalt 2 are the only ones to retain good properties post weathering. This is because asphalt 2 is a very compatible asphalt. In general, soft bitumens with penetrations greater than about 125 dmm are compatible. Since bituminous compositions made with block copolymer and soft bitumens can be too tacky or soft, they must be filled.

I claim:

1. A composition for use in roll roofing membrane applications which comprises:

(a) from about 1 part to about 50 parts per hundred of filler, and (b) from about 50 parts to about 99 parts per hundred of a bituminous composition which is comprised of (1) from about 87 to about 92 parts per hundred of a bituminous component having a penetration of greater than about 125 dmm at 25° C., and (2) from about 7 to about 13 parts per hundred of a hydrogenated block copolymer of a monoalkenyl aromatic hydrocarbon and a conjugated diolefin having a contour arm molecular weight before hydrogenation of from about 80,000 to about 150,000 and a polystyrene content of from about 25% to about 37%, the molecular weight being peak molecular weight determined by gel permeation chromatography.

2. A process for making a roll roofing membrane which consists of applying the composition of claim 1 to a reinforcing mat.

3. A composition for use in roll roofing membrane applications which consists of:

(a) from about 1 part to about 50 parts per hundred of filler, and (b) from about 50 parts to about 99 parts per hundred of a bituminous composition which consists of (1) from about 87 to about 93 parts per hundred of a bituminous component having a penetration of greater than about 125 dmm at 25°C., and (2) from about 7 to about 13 parts per hundred of a hydrogenated block copolymer of a monoalkenyl aromatic hydrocarbon and a conjugated diolefin having a contour arm molecular weight before hydrogenation of from about 120,000 and a polystyrene content of from about 25% to about 37%, the molecular weight being peak molecular weight determined by gel permeation chromatography.

4. A process for making a roll roofing membrane which consists of:

(i) providing a composition consisting of (a) from about 1 part to about 50 parts per hundred of filler, and (b) from about 50 parts to about 99 parts per hundred of a bituminous composition which consists of (1) from about 87 to about 93 parts per hundred of a bituminous component having a penetration of greater than about 125 dmn at 25°C., (2) from about 7 to about 13 parts per hundred of a hydrogenated block copolymer of a monoalkenyl aromatic hydrocarbon and a conjugated diolefin having a contour arm molecular weight before hydrogenation of about 120,000 and a polystyrene content of from about 25% to about 37%, the molecular weight being peak molecular weight determined by gel permeation chromatography, and (ii) applying said composition to a reinforcing mat.

* * * * *